US007868898B2

(12) United States Patent
Jeffrey et al.

(10) Patent No.: US 7,868,898 B2
(45) Date of Patent: Jan. 11, 2011

(54) METHODS AND APPARATUS FOR EFFICIENTLY ACCESSING REDUCED COLOR-RESOLUTION IMAGE DATA

(75) Inventors: Eric Jeffrey, Richmond (CA); Jiliang Song, Surrey (CA); John Peter van Baarsen, Delta (CA); Jerzy Wieslaw Swic, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 783 days.

(21) Appl. No.: 11/381,853

(22) Filed: May 5, 2006

(65) Prior Publication Data

US 2007/0046684 A1 Mar. 1, 2007

Related U.S. Application Data

(60) Provisional application No. 60/710,765, filed on Aug. 23, 2005, provisional application No. 60/711,098, filed on Aug. 25, 2005.

(51) Int. Cl.
*G06F 12/06* (2006.01)
*G09G 5/39* (2006.01)
*G09G 5/00* (2006.01)

(52) U.S. Cl. ........................ 345/572; 345/531; 345/649

(58) Field of Classification Search ................. 345/572, 345/531, 649
See application file for complete search history.

(56) References Cited

U.S. PATENT DOCUMENTS 5,493,535 A * 2/1996 Cho ...................... 365/230.04
5,815,646 A * 9/1998 Purcell et al. ............... 345/502
5,940,874 A * 8/1999 Fulcomer .................... 711/217
6,104,416 A * 8/2000 McGuinness ............... 345/544
6,301,299 B1 * 10/2001 Sita et al. ............... 375/240.01
6,326,984 B1 12/2001 Chow et al.
6,400,851 B1 6/2002 Shih
6,567,556 B1 * 5/2003 Bramley ..................... 382/233
6,683,642 B1 * 1/2004 Kobayashi et al. ....... 348/231.2
6,774,902 B2 8/2004 Yamagata
6,819,334 B1 * 11/2004 Owada et al. ............... 345/659
6,859,237 B2 * 2/2005 Swartz ....................... 348/700
6,961,063 B1 11/2005 Kuriakin et al.
7,015,918 B2 * 3/2006 Linzer et al. ................ 345/537
7,139,865 B2 * 11/2006 Urard ......................... 711/104
7,190,368 B2 * 3/2007 Linzer et al. ................ 345/536
7,190,413 B2 * 3/2007 Linzer et al. ................ 348/716
7,362,809 B2 * 4/2008 Booth et al. ........... 375/240.16
7,557,811 B2 * 7/2009 Linzer et al. ................ 345/531
2001/0019637 A1 9/2001 Robey et al.
2004/0100472 A1 * 5/2004 Linzer et al. ................ 345/536
2004/0100577 A1 * 5/2004 Linzer et al. ................ 348/383
2004/0113913 A1 * 6/2004 Gu et al. ..................... 345/549
2005/0062755 A1 3/2005 Van Dyke et al.
2005/0249435 A1 11/2005 Rai et al.

* cited by examiner

*Primary Examiner*—Daniel Washburn
(74) *Attorney, Agent, or Firm*—Mark P. Watson

(57) ABSTRACT

The invention is directed, in one embodiment, to a method for generating memory addresses for accessing an image in which each pixel in a group of pixels has a luma component, but shares chroma components with other pixels of the group. A preferred method includes providing a memory, having a plurality of first portions and a plurality of second portions. First memory addresses may be generated, each of which corresponds to one of the first portions. Each first address defines a storage location for the luma components of one of the pixel groups. Second memory addresses may be generated, each of which corresponds to one of the second portions. Each second address defines a storage location for the chroma components of at least one of the pixel groups.

31 Claims, 11 Drawing Sheets

| | Byte 0 | Byte 1 | Byte 2 | Byte 3 | Byte 4 | Byte 5 | Byte 6 | Byte 7 |
|---|---|---|---|---|---|---|---|---|
| Address 0 | $U_{0,0}$ | $Y_{0,0}$ | $Y_{0,1}$ | $U_{0,2}$ | $Y_{0,2}$ | $Y_{0,3}$ | $U_{0,4}$ | $Y_{0,4}$ |
| Address 1 | $Y_{0,5}$ | $U_{0,6}$ | $Y_{0,6}$ | $Y_{0,7}$ | $V_{1,0}$ | $Y_{1,0}$ | $Y_{1,1}$ | $V_{1,2}$ |
| Address 2 | $Y_{1,2}$ | $Y_{1,3}$ | $V_{1,4}$ | $Y_{1,4}$ | $Y_{1,5}$ | $V_{1,6}$ | $Y_{1,6}$ | $Y_{1,7}$ |
| Address 3 | $U_{2,0}$ | $Y_{2,0}$ | $Y_{2,1}$ | $U_{2,2}$ | $Y_{2,2}$ | $Y_{2,3}$ | $U_{2,4}$ | $Y_{2,4}$ |
| Address 4 | $Y_{2,5}$ | $U_{2,6}$ | $Y_{2,6}$ | $Y_{2,7}$ | $V_{3,0}$ | $Y_{3,0}$ | $Y_{3,1}$ | $V_{3,2}$ |
| Address 5 | $Y_{3,2}$ | $Y_{3,3}$ | $V_{3,4}$ | $Y_{3,4}$ | $Y_{3,5}$ | $V_{3,6}$ | $Y_{3,6}$ | $Y_{3,7}$ |
| Address 6 | | | | | | | | |
| Address 7 | | | | | | | | |

38

*FIG. 4*

| | Byte 0 | Byte 1 | Byte 2 | Byte 3 |
|---|---|---|---|---|
| Address 0 | $Y_{0,0}$ | $Y_{0,1}$ | $Y_{0,2}$ | $Y_{0,3}$ |
| Address 1 | $Y_{0,4}$ | $Y_{0,5}$ | $Y_{0,6}$ | $Y_{0,7}$ |
| Address 2 | $Y_{1,0}$ | $Y_{1,1}$ | $Y_{1,2}$ | $Y_{1,3}$ |
| Address 3 | $Y_{1,4}$ | $Y_{1,5}$ | $Y_{1,6}$ | $Y_{1,7}$ |
| Address 4 | $Y_{2,0}$ | $Y_{2,1}$ | $Y_{2,2}$ | $Y_{2,3}$ |
| Address 5 | $Y_{2,4}$ | $Y_{2,5}$ | $Y_{2,6}$ | $Y_{2,7}$ |
| Address 6 | $Y_{3,0}$ | $Y_{3,1}$ | $Y_{3,2}$ | $Y_{3,3}$ |
| Address 7 | $Y_{3,4}$ | $Y_{3,5}$ | $Y_{3,6}$ | $Y_{3,7}$ |

32

| | Byte 0 | Byte 1 | Byte 2 | Byte 3 |
|---|---|---|---|---|
| Address 0 | $U_{0,0}$ | $U_{0,2}$ | $U_{0,4}$ | $U_{0,6}$ |
| Address 1 | $V_{1,0}$ | $V_{1,2}$ | $V_{1,4}$ | $V_{1,6}$ |
| Address 2 | $U_{2,0}$ | $U_{2,2}$ | $U_{2,4}$ | $U_{2,6}$ |
| Address 3 | $V_{3,0}$ | $V_{3,2}$ | $V_{3,4}$ | $V_{3,6}$ |

34

*FIG. 5*

| | Byte 0 | Byte 1 | Byte 2 | Byte 3 | ORDER WRITTEN | |
|---|---|---|---|---|---|---|
| Address 0 | $Y_{3,7}$ | $Y_{3,6}$ | $Y_{2,7}$ | $Y_{2,6}$ | 12 | 16 |
| Address 1 | $Y_{3,5}$ | $Y_{3,4}$ | $Y_{2,5}$ | $Y_{2,4}$ | 11 | 15 |
| Address 2 | $Y_{3,3}$ | $Y_{3,2}$ | $Y_{2,3}$ | $Y_{2,2}$ | 10 | 14 |
| Address 3 | $Y_{3,1}$ | $Y_{3,0}$ | $Y_{2,1}$ | $Y_{2,0}$ | 9 | 13 |
| Address 4 | $Y_{1,7}$ | $Y_{1,6}$ | $Y_{0,7}$ | $Y_{0,6}$ | 4 | 8 |
| Address 5 | $Y_{1,5}$ | $Y_{1,4}$ | $Y_{0,5}$ | $Y_{0,4}$ | 3 | 7 |
| Address 6 | $Y_{1,3}$ | $Y_{1,2}$ | $Y_{0,3}$ | $Y_{0,2}$ | 2 | 6 |
| Address 7 | $Y_{1,1}$ | $Y_{1,0}$ | $Y_{0,1}$ | $Y_{0,0}$ | 1 | 5 |

| | Byte 0 | Byte 1 | Byte 2 | Byte 3 | ORDER WRITTEN | |
|---|---|---|---|---|---|---|
| Address 0 | $U_{2,6}$ | $V_{3,6}$ | $U_{2,4}$ | $V_{3,4}$ | 6 | 8 |
| Address 1 | $U_{2,2}$ | $V_{3,2}$ | $U_{2,0}$ | $V_{3,0}$ | 5 | 7 |
| Address 2 | $U_{0,6}$ | $V_{1,6}$ | $U_{0,4}$ | $V_{1,4}$ | 2 | 4 |
| Address 3 | $U_{0,2}$ | $V_{1,2}$ | $U_{0,0}$ | $V_{1,0}$ | 1 | 3 |

30

*FIG. 9*

| | Byte 0 | Byte 1 | Byte 2 | Byte 3 | ORDER WRITTEN | |
|---|---|---|---|---|---|---|
| Address 0 | $Y_{3,0}$ | $Y_{2,0}$ | $Y_{3,1}$ | $Y_{2,1}$ | 9 | 13 |
| Address 1 | $Y_{1,0}$ | $Y_{0,0}$ | $Y_{1,1}$ | $Y_{0,1}$ | 1 | 5 |
| Address 2 | $Y_{3,2}$ | $Y_{2,2}$ | $Y_{3,3}$ | $Y_{2,3}$ | 10 | 14 |
| Address 3 | $Y_{1,2}$ | $Y_{0,2}$ | $Y_{1,3}$ | $Y_{0,3}$ | 2 | 6 |
| Address 4 | $Y_{3,4}$ | $Y_{2,4}$ | $Y_{3,5}$ | $Y_{2,5}$ | 11 | 15 |
| Address 5 | $Y_{1,4}$ | $Y_{0,4}$ | $Y_{1,5}$ | $Y_{0,5}$ | 3 | 7 |
| Address 6 | $Y_{3,6}$ | $Y_{2,6}$ | $Y_{3,7}$ | $Y_{2,7}$ | 12 | 16 |
| Address 7 | $Y_{1,6}$ | $Y_{0,6}$ | $Y_{1,7}$ | $Y_{0,7}$ | 4 | 8 |

| | Byte 0 | Byte 1 | Byte 2 | Byte 3 | ORDER WRITTEN | | | |
|---|---|---|---|---|---|---|---|---|
| Address 0 | $U_{2,0}$ | $V_{3,0}$ | $U_{0,0}$ | $V_{1,0}$ | 1 | 5 | 9 | 13 |
| Address 1 | $U_{2,2}$ | $V_{3,2}$ | $U_{0,2}$ | $V_{1,2}$ | 2 | 6 | 10 | 14 |
| Address 2 | $U_{2,4}$ | $V_{3,4}$ | $U_{0,4}$ | $V_{1,4}$ | 3 | 7 | 11 | 15 |
| Address 3 | $U_{2,6}$ | $V_{3,6}$ | $U_{0,6}$ | $V_{1,6}$ | 4 | 8 | 12 | 16 |

30

*FIG. 10*

METHODS AND APPARATUS FOR EFFICIENTLY ACCESSING REDUCED COLOR-RESOLUTION IMAGE DATA

CROSS-REFERENCE TO RELATED APPLICATIONS

This application claims priority from U.S. Provisional Patent Applications No. 60/711,098, filed Aug. 25, 2005, entitled "A Method for Storing YUV 4:2:0 Data To Simplify Image Rotation,", and No. 60/710,765, filed Aug. 23, 2005, entitled "A Method To Save Bandwidth In Saving Or Retrieving Image When Stored in YUV 420,", which are hereby incorporated by reference in their entirety.

BACKGROUND

1. Field

The invention relates generally to storage arrangements for reduced color-resolution image data in a memory, and particularly to methods and apparatus for efficiently accessing reduced color-resolution image data.

2. Description of the Related Art

Pixels defined in the YCbCr color space are described by a luma component (Y), and two chroma components (Cb, Cr). Each component is often represented by a one byte value. In addition, pixels in a digital image are arranged in raster order. A raster pattern refers to the scanning of an image from side-to-side in lines from top-to-bottom.

Commonly, digital images are stored into and fetched from a computer memory, and it is generally important to minimize the size of memory in computer systems. One technique sometimes employed for reducing memory requirements is reducing the color resolution of image data. The human eye is more sensitive to brightness than to color so the color resolution of an image can be lowered with modest visual impact. Color resolution is reduced by chroma subsampling. That is, while the luma information for every pixel in the image is sampled, the chroma information from fewer than all of the pixels is sampled. Reducing the color resolution of an image means that it can be stored in fewer bytes than is required to store the image at its full-resolution. Certain operations, however, can not be performed on a reduced color-resolution image. Accordingly, before these operations can be performed, the missing color information must be reintroduced into the image (by interpolation or repetition).

The color resolution of an image may be reduced horizontally, vertically, or in both dimensions. For example, if the color resolution is reduced horizontally, sampling is performed on groups of horizontally adjacent pixels in a line, such as a group of four adjacent pixels. The Y information of every pixel in the group is sampled, but the Cr and Cb information from less then every pixel is sampled. Reduction in the vertical direction is analogous, except sampling is performed on groups of vertically adjacent pixels in a column. On the other hand, if the color resolution is reduced both horizontally and vertically, sampling is performed on a group of pixels that are both horizontally and vertically adjacent, such as a group of two horizontally adjacent pixels in two vertically adjacent lines. As before, the Y information of every pixel in the group is sampled, but the Cr and Cb information from less then every pixel is sampled. For example, Cr information may be sampled from every other pixel on the odd-numbered lines, while Cb may be sampled from every other pixel on the even-numbered lines. When the color-resolution of the image has been reduced both horizontally and vertically, data access efficiency may suffer when the image is fetched for the purpose of reintroducing the missing color information.

Memory bandwidth refers to the amount of data that can be written to or read from a memory in a given time period, e.g., bytes per second. The amount of memory bandwidth available in a system depends on the memory clock frequency and the width of the memory bus. Given a particular bus width and frequency, there is a finite amount of bandwidth available in any given time period. The percentage of that finite amount of bandwidth being used at any time depends on the particular operation(s) being performed. It also depends on how efficiently those operations are performed. Systems must be designed so that there is always a sufficient amount of bandwidth available for performing necessary operations. Stated another way, a system should have enough bandwidth to accommodate peak and not merely average bandwidth requirements. However, as power consumption is proportional to clock frequency, it is desirable to limit the memory bandwidth (e.g., clock frequency) as much as possible, while still accommodating peak bandwidth requirements.

Of course, it is also desirable to have operations performed as efficiently as possible in terms of the number of memory accesses they need. Typically, memories formed from semiconductors are conceptually organized into rows and columns. When a memory is accessed, there is a maximum number of bytes at a particular row address that can be written or read in each access cycle. For example, if the memory bus is four bytes wide, it is possible (in an SRAM type memory) to access up to four bytes within a row in a single access. Sometimes four bytes from the specified row are needed, but at other times fewer than four may be needed. "Data access efficiency," as the term is used herein, refers to the percentage of bytes available in a memory read cycle that are actually needed. Obviously, an operation that requires four memory cycles to fetch four bytes is less efficient than one that can fetch the four bytes in a single memory cycle. Similarly, the term also refers to the percentage of the maximum possible number of bytes that are actually stored in a memory write cycle.

Generally, an image will be transmitted for storing in a memory in raster order. A common way to store an image in memory is to store raster-ordered pixels at sequential memory addresses as they are received, which is an efficient way to store the image data. However, if an image in which the color-resolution has been reduced both horizontally and vertically is stored in raster order, data access efficiency can suffer when the image is fetched for the purpose of reintroducing the missing color information. This is because the Cr and Cb components needed to calculate missing color information are not stored "locally," that is, they are not stored in the same row with the associated Y components.

Another situation where data access efficiency suffers is where a reduced color-resolution image is presented in raster order for storing in a memory and it is desired to display the image in a rotated orientation. An image may be rotated when it is stored into or when it is fetched from memory. Consider the case of rotating an image by 90 degrees upon storing. Further, assume that the color-resolution of the image has been reduced both horizontally and vertically. This operation typically requires that the image data be stored in such a way that fetching from sequential memory addresses provides a rotated, raster-ordered version of the image. The reason that "data access efficiency" suffers in this situation is because the Cr and Cb components needed to calculate missing color information for associated Y components should, for efficent fetching, be stored locally in the memory. However, the Cr and Cb components are not "local" to one another in the raster-ordered data stream presented for storage. First, two Y components and the Cr component from a first line will appear sequentially in the data stream. Later, two Y more components and the Cb component from pixels in the same image columns, but on the line below will appear sequentially in the data stream. The first and second groups of three components separated temporally by the time needed to store a line of image data. Accordingly, because there is a time delay before the second group can be stored, two memory accesses are needed.

Data access efficiency can also be penalized where a single storage arrangement is used for displaying an image in both rotated and non-rotated orientations. As an example, the frame to be displayed often includes two or more distinct images, e.g., a main window and one or more sub-windows. It is desirable to be able to rotate one image while not rotating the other. It is also desirable to store the entire frame using a single storage arrangement. However, displaying a main window without rotation while displaying a sub-window in a rotated orientation is a situation where data access efficiency suffers when the image is stored using certain storage arrangements.

Accordingly, there is a need for storage arrangements for reduced color-resolution image data, and particularly to methods and apparatus for efficiently accessing reduced color-resolution image data in a memory.

SUMMARY

The invention is directed, in one embodiment, to a method for generating memory addresses for accessing an image in which groups of pixels share chroma components. The method includes providing a memory, having a plurality of first portions and a plurality of second portions. In addition, the method includes generating first memory addresses, each of which corresponds to one of the first portions of the memory. Each such first address may be used as an address where the luma components of one of the pixel groups are stored. In addition, the method includes generating second memory addresses, each of which corresponds to one of the second portions of the memory. Each such second address may be used as an address where the chroma components one of the pixel groups is stored.

In another embodiment, the invention is directed to a graphics display controller for use with the data of an image for which groups of pixels share chroma components as a result of a reduction in the color resolution of the image. The graphics display controller includes a memory, having a plurality of first portions and a plurality of second portions, and an address generator. The address generator is capable of generating first memory addresses, each of which corresponds to one of the first portions. Each such first address may be used as an address where the luma components of one of the pixel groups are stored. In addition, the address generator is capable of generating second memory addresses, each of which corresponds to one of the second portions. Each such second address may be used as an address where the chroma components of one of the pixel groups are stored.

In another embodiment, the invention is directed to a device for use with the data of an image for which groups of pixels share chroma components as a result of a reduction in the color resolution of the image. Preferably, the device includes an image data source, a display device, a memory, and an address generator. The memory has a plurality of first portions and a plurality of second portions. The address generator is capable of generating first memory addresses, each of which corresponds to one of the first portions. Each such first address may be used as an address where the luma components of one of the pixel groups are stored. In addition, the address generator is capable of generating second memory addresses, each of which corresponds to one of the second portions. Each such second address may be used as an address where the chroma components of one of the pixel groups are stored.

The objectives, features, and advantages of the invention will be more readily understood upon consideration of the following detailed description of the invention, taken in conjunction with the accompanying drawings.

BRIEF DESCRIPTION OF THE DRAWINGS

FIG. 4 illustrates the second memory of FIG. 2*a* with the reduced color-resolution image of FIG. 1*b* stored in the memory in the raster-ordered output sequence shown in FIG. 3.

FIG. 5 illustrates the first memory of FIG. 2*a* with the reduced color-resolution image FIG. 1*b* stored in the memory in the raster-ordered output sequence shown in FIG. 3.

FIG. 9 illustrates the first memory of FIG. 2*a* with the reduced color-resolution image of FIG. 1*b* stored in the memory according to an alternate embodiment of the invention.

FIG. 10 illustrates the first memory of FIG. 2*a* with the reduced color-resolution image of FIG. 1*b* stored in the memory according to an alternate embodiment of the invention.

DETAILED DESCRIPTION

Figure 1A:
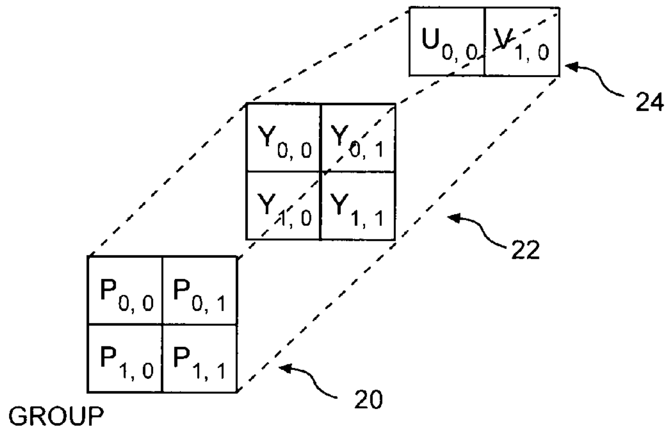
(PRIOR ART) FIG. 1a
FIG. 1*a* illustrates a group of pixels.

The present invention is directed generally to storage arrangements for reduced color-resolution image data in a memory, and particularly to methods and apparatus for efficiently accessing reduced color-resolution image data. Reference will now be made in detail to the present preferred embodiments of the invention, examples of which are illustrated in the accompanying drawings. Wherever possible, the same reference numbers are used in the drawings and the description to refer to the same or like parts.

In the YCbCr color space, luma (Y) refers to a quantity representative of luminance. The term "color-difference" is used herein as having the same meaning as "chroma." In the art, the term "YUV" is sometimes used to refer to the YCbCr color space. In this specification, the term YUV is used to refer to the YCbCr color space. e.g., Y=Y, U=Cr, and V=Cb. In addition, the terms "sample" and "component" are used herein with respect to a pixel as having the same meaning.

Chroma subsampling is usually expressed in terms of the number of each of three types of components in a sample area, i.e., #:#:#. The sample area is often four pixels and common sample formats include: 4:2:2, 4:2:0, and 4:1:1. In the 4:2:0 format, one color-difference component has half the sample rate of the luma components, and alternate color-difference components are sampled in alternate lines. Preferably, the inventions disclosed herein are for use with reduced color-resolution image data in the 4:2:0 format.

FIG. 1*a* illustrates a 2×2 group (or "tile") 20 of pixels, specifically the pixels $P_{0,0}$, $P_{0,1}$, $P_{1,0}$, and $P_{1,1}$. (Herein, the first subscript denotes the row and the second the column.) Image data is generally presented in raster order for chroma subsampling. Thus, the pixels $P_{0,0}$ and $P_{0,1}$ would be presented first for sampling. Preferably, the U values of two adjacent pixels on a line are averaged to create a U sample, e.g., $U_{0,0}$. Subsequently, after the entire line 0 has been presented, the pixels $P_{1,0}$, and $P_{1,1}$ would be presented for sampling. Preferably, the V values of two adjacent pixels on the next sequential line are averaged to create a V sample, e.g., $V_{1,0}$. One of ordinary skill in the art will appreciate other ways in which the U and V samples may be created, however, it should be noted that the particular manner in which the U and V values are created is not critical.

In FIG. 1*a*, the luma components for the tile 20 are indicated by reference number 22. The color-difference components according to a 4:2:0 sampling format are indicated by reference number 24. As can be seen from the figure, there are four Y samples, one U sample, and one V sample for the 2×2 group 20 of four pixels. All four pixels in the group 20 share the same U, V values. Provided that the color resolution of the shown pixels $P_{0,0}$, $P_{0,1}$, $P_{1,0}$, and $P_{1,1}$ is reduced according to the 4:2:0 format, the components 22 and 24, in combination, are equivalent to the pixel group 20.

Figure 1B:
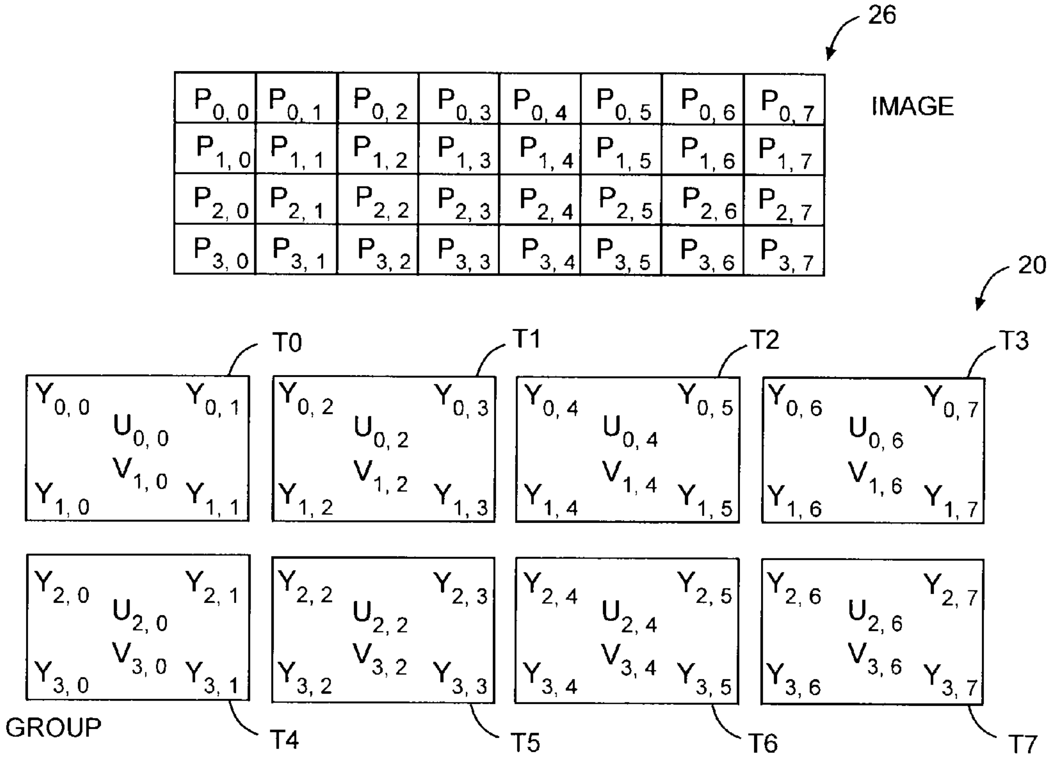
(PRIOR ART) FIG. 1b
FIG. 1*b* illustrates an exemplary image having groups of pixels.

FIG. 1*b* shows an exemplary image 26. The image 26 comprises four rows and eight columns of pixels. Typical images are much larger, but the image 26 is useful in this description for illustrating the principles of the invention. The image 26 includes the pixel tile 20. FIG. 1*b* also shows eight pixel groups 20, T0-T7. The pixel groups 20, T0-T7 are in the form shown in FIG. 1*a* for luma and chroma components 22 and 24, and are equivalent to the components 22 and 24, provided that the color resolution of image 26 is reduced according to the 4:2:0 format. Thus, the eight pixel groups T0-T7 represent an alternate view of the image 26.

The embodiments of the invention may be used with memories having a variety of different row and column configurations. Preferably, the embodiment are for use with a row and column configuration according to the memory 30 described below. In alternative embodiments, the inventions disclosed herein may be used with row and column configurations according to the memories 36 and 40 described below, as well as with other memory configurations.

Figure 2A:
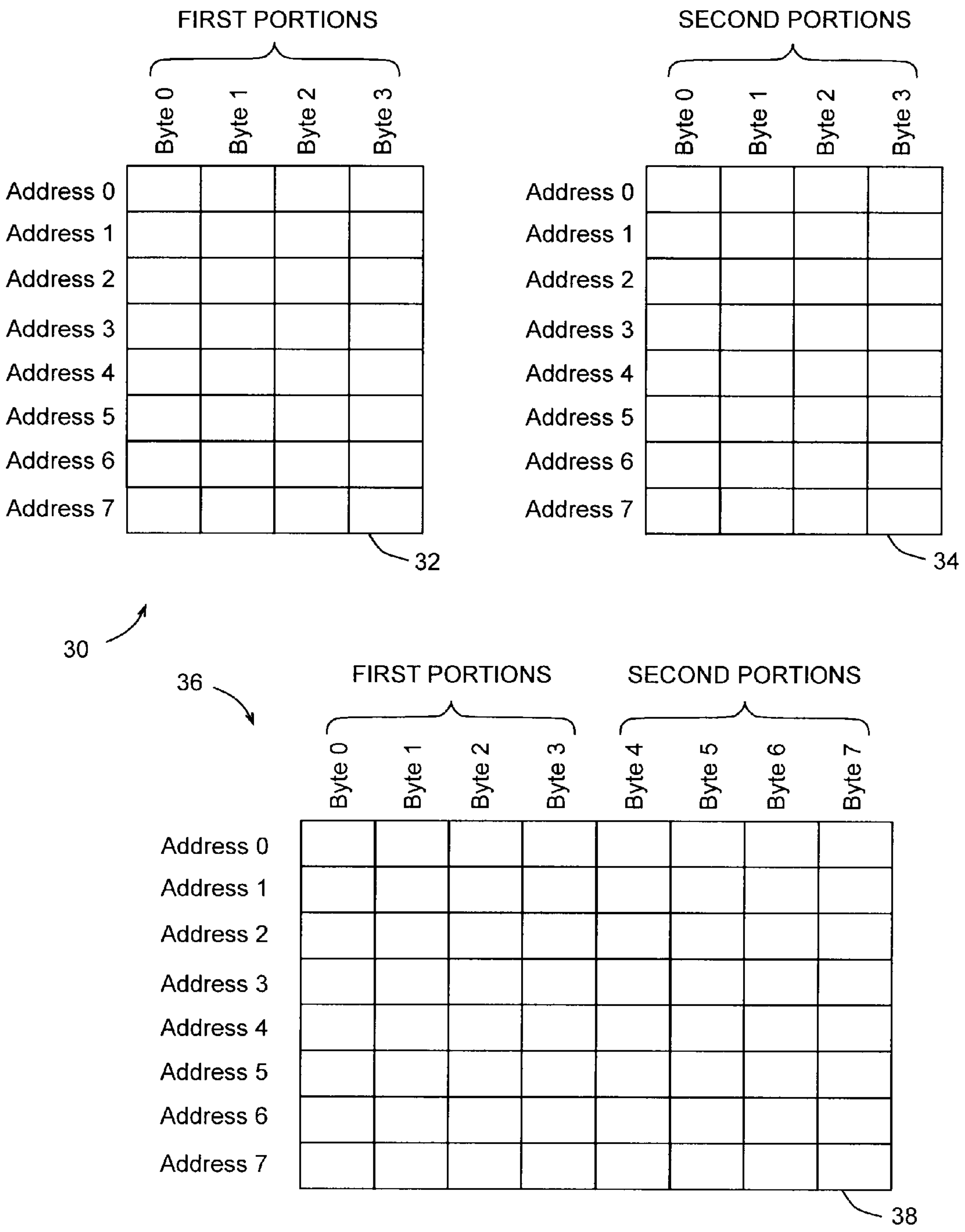
FIG. 2*a* illustrates first and second exemplary memories.
Figure 2B:
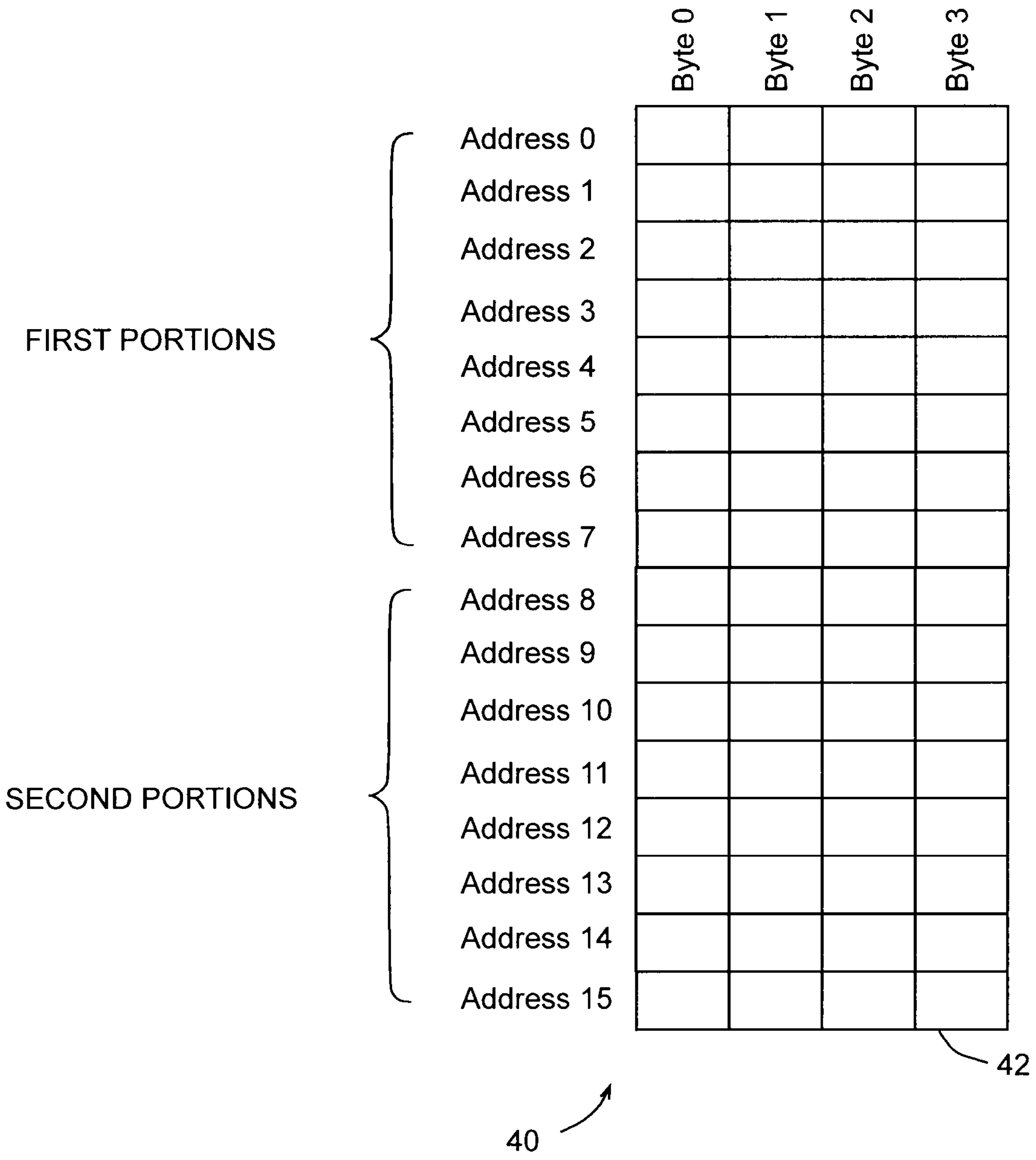
FIG. 2*b* illustrates a third exemplary memory.

FIG. 2*a* illustrates the first exemplary memory 30 and the second exemplary memory 36. FIG. 2*b* illustrates the third exemplary memory 40. Typical memories are larger, but the memories 30, 36, and 40 are useful in this description for illustrating the principles of the invention. Preferably, the memories 30, 36, and 40 are SRAMs, but in alternative embodiments, the memories 30, 36, and 40 may be of the DRAM, FLASH, or other semi-conductor storage type memories conceptually organized into rows and columns.

Each of the memories 30, 36, and 40 is notionally organized into a plurality of rows and columns. The memory 30 includes two "banks" 32, 34. Bank 32 includes a first set of rows, while Bank 34 includes a second set of rows. In the memory 30, the rows of bank 32 are designated or allocated as first "portions" while the rows of bank 34 are designated or allocated as second "portions." The memories 36 and 40 are comprised of a single bank 38, 42, respectively. With respect to the memory 36, the bytes 0-3 of each row are allocated as first "portions" and the bytes 4-7 of each row are designated as second "portions." In the memory 40, some of the rows are allocated as first portions while others are allocated or designated as second portions, as shown.

In order to access data in a random access memory, such as the memories 30, 36, and 40, the first step a memory controller needs to perform is to specify a row address. Once the memory controller has selected a particular row, it can select one or more columns in the row to access. To access data in another row, the memory controller needs to first repeat the step of specifying a row address.

In the memory 30, the first and second banks, or RAM cells, may or may not reside in the same semiconductor, but generally have the property that each bank can be accessed simultaneously. In other words, the data stored in any first portion and the data stored in any second portion may be fetched at the same time. Likewise, data may be stored in the two portions simultaneously.

In contrast, data stored in particular first and second portions of the memory 36 cannot, generally speaking, be accessed at the same time as only one row in the bank 38 can be accessed at any point in time. (Only when the desired first and second portions reside in the same memory row is it possible to access first and second portions simultaneously.) In addition, data stored in particular first and second portions of the memory 40 can not be accessed at the same time. Like memory 36, only one row in the memory 40 can be accessed at any point in time.

The number of bits that can be stored in a memory row is referred to as the "memory width." Each bank of a memory is capable of storing one or more bits. In a preferred embodiment, the above-described "portions" are capable of storing 4 bytes. In an alternative embodiment, the portions are capable of storing 8 bytes. Thus, the width of banks 32 and 34 are 4 bytes, the width of bank 38 is 8 bytes, and the width of bank 42 is 4 bytes. In other embodiments of the invention, alternative memory widths may be employed.

Figure 3:
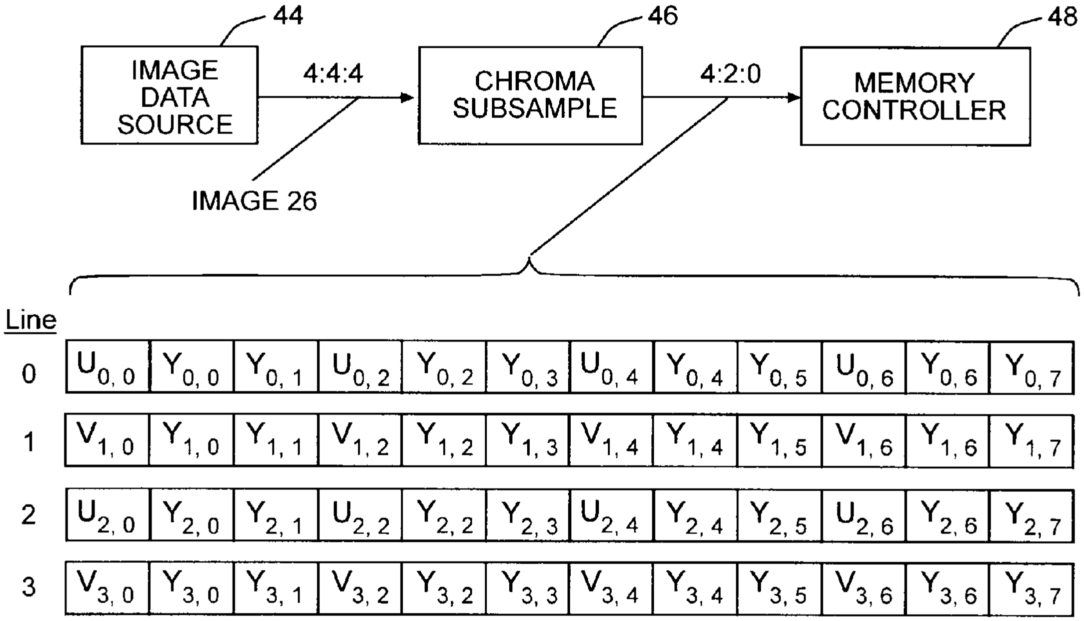
FIG. 3 is a block diagram illustrating an exemplary part of a graphics display system that includes a chroma subsampling unit and exemplary output of the chroma subsampling unit when the image of FIG. 1*b* is provided as input.

FIG. 3 is a block diagram illustrating an exemplary portion of a graphics display system. An image data source 44 provides YUV 4:4:4 image data to a chroma subsampling unit 46. The image data may be, for example, the image 26 (FIG. 1*b*). The chroma subsampling unit 46 preferably samples the data as described above with reference to FIG. 1*a*. The chroma subsampling unit 46 outputs YUV 4:2:0 image data which it presents to a memory controller 48. The image data source 44 may be a host, a camera, or any other source capable of providing image data. Typically, the image data source 44 provides image data in raster order, but this is not critical. The YUV 4:2:0 chroma subsampled data stream output from the chroma subsampling unit 46 for the image 26 is also shown in FIG. 3.

In the Background above, it was said that the Cr and Cb components are not "local" to one another in the raster-ordered data stream presented for storage. FIG. 3 illustrates what is meant by "not local in the data stream." $U_{0,0}$, $Y_{0,0}$, and $Y_{0,1}$ from line 0 appear sequentially in the data stream. In addition, $V_{01,0}$, $Y_{1,0}$, and $Y_{1,1}$, from line 1 appear sequentially in the data stream. However, the two groups of three samples, which together provide all of the necessary information to define a 2×2 pixel group, are separated by a line of image data, in this example—nine samples. Thus, the U component is not local to the $Y_{1,0}$, and $Y_{1,1}$, components, and the V component is not local to the $Y_{0,0}$, and $Y_{0,1}$ components.

The metric "accesses per pixel" is used herein to quantify the degree of data access efficiency. If it is assumed that a 2×2 group of pixels in the YUV 4:2:0 format is defined by 6 bytes, each component being one byte, and the memory bus is four bytes wide, the best achievable efficiency for storing or fetching data is 0.375 accesses per pixel. For writing data, this efficiency would be achieved where an input stream of pixel components is separated into groups of four sequential samples, and each group is placed on the bus for storing in a single access. In the 4:2:0 format, six samples define four pixels so each sample ("s") effectively defines ⅔ of a pixel ("p"): (6s/4p=1s/0.667p). In each access four samples are stored, and four samples are equivalent to 8/3 pixels (4*0.667p). Therefore, each access stores 8/3 pixels. Accordingly, when expressed in accesses ("a") per pixel, the efficiency is 0.375 accesses per pixel: (1a/4s=1a/(8/3p)=3/8 a/p). Similarly, for fetching data, this efficiency is achieved where four pixel components are placed on the bus in every read access. When both storing and fetching data are taken into account, the best achievable data access efficiency is 0.75 accesses per pixel (0.375+0.375).

FIG. 4 shows one way of storing YUV 4:2:0 data. FIG. 4 illustrates the memory bank 38 with the YUV 4:2:0 image data of the image 26 stored therein. The image data is stored at sequential memory locations in the order that it is generated by the chroma subsampling unit 46, assuming that the image data is presented to the unit 46 in raster order. Storing image data in the arrangement of FIG. 4 requires 0.375 memory accesses per pixel, assuming the memory bus is four bytes wide. Twelve writes of 4 bytes each are used to store 32 pixels: (12 accesses/32 pixels=0.375). While this storage arrangement is efficient for storing, it has a number of disadvantages when it comes to fetching.

Fetching the image data for raster order, non-rotated presentation requires 0.625 memory accesses per pixel. In addition, fetching the image data for raster order, 90 degree-rotated presentation requires 1.0 memory accesses per pixel. Thus, the total accesses per pixel for both storing and fetching are 1.0 and 1.375, respectively, for non-rotated and 90 degree-rotated presentations. Moreover, as mentioned above, only one row can be accessed at a time. So even though data access is not as inefficient as other arrangements, the memory clock would need to be much faster than is needed when compared with a storage arrangement that employs two independently accessible banks, such as the memory 30.

FIG. 5 shows another way that YUV 4:2:0 data could be stored. FIG. 5 illustrates the two independently accessible memory banks 32, 34 with the YUV 4:2:0 image data of the image 26 stored therein. Luma image data is stored at sequential bytes in sequential rows in bank 32 in the order generated by the chroma subsampling unit 46. Chroma image data is stored in a similar sequential fashion in the bank 34 in the order that it is generated. It is assumed that the image data is presented to the unit 46 in raster order.

Writing raster-ordered image data in the storage arrangement of FIG. 5, requires 0.25 memory accesses per pixel for bank 32, and 0.125 memory accesses per pixel for bank 34. In the 4:2:0 format, four Y samples define four pixels so each Y sample effectively defines 1 pixel. In addition, one U or V sample defines four pixels. For writing data, four Y samples, or four U or V samples can be placed on the bus in each access. Thus, storing Y samples in bank 32 results in an access per pixel efficiency of 0.25 (1a/4s=1a/4p=¼ a/p). Similarly, storing a pair of UV samples in bank 32 results in an access per pixel efficiency of 0.125 (1a/4s=1a/16p=1/16 a/p=0.063; 2×0.063=0.125). When both banks are considered, this arrangement requires 0.375 memory accesses per pixel for storing image data.

Fetching image data arranged as shown in FIG. 5 for raster order, non-rotated presentation similarly requires 0.25 memory accesses per pixel for bank 32, and 0.125 memory accesses per pixel for bank 34. In each read access, four Y samples can be fetched from bank 32, and four U or V samples can be fetched from bank 34. Taking both banks into account, 0.5 memory accesses per pixel are required for fetching. Thus, the total accesses per pixel for both storing and fetching are 0.375 for non-rotated presentations. The data access efficiency information is summarized in the tables below:

| Non-Rotated | | |
|---|---|---|
| Writes/Pixel | Reads/Pixel | Total Accesses/Pixel |
| Bank 32 | | |
| 0.25 | 0.25 | 0.5 |
| Bank 34 | | |
| 0.125 | 0.125 | 0.25 |

With respect to the storage arrangement of FIG. 5, the data access efficiency for fetching an image for the purpose of reintroducing missing color information is relatively good. However, when data access efficiency for 90 degree-rotated presentation is considered, the arrangement of image data shown in FIG. 5 is relatively poor.

Figure 8:
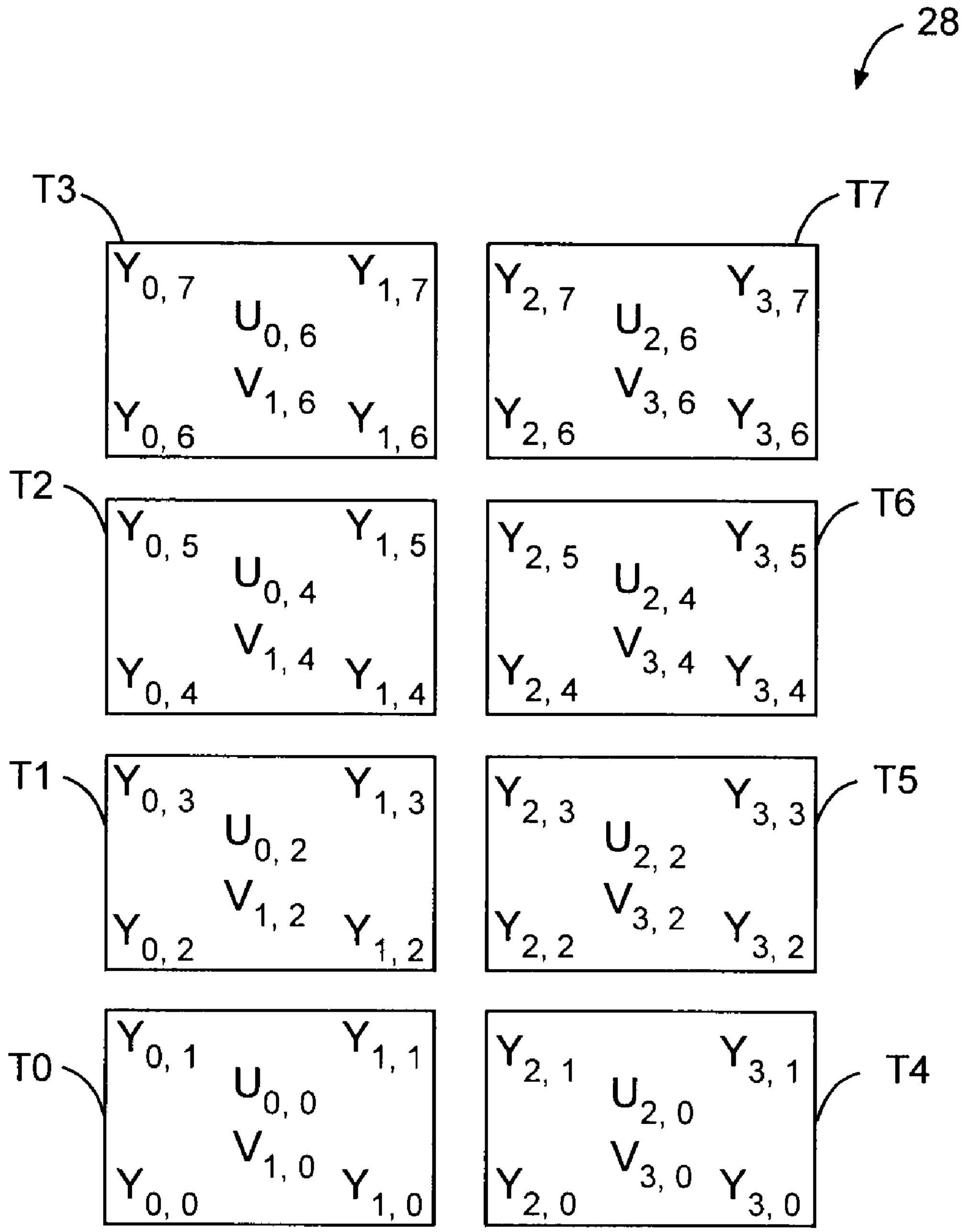
FIG. 8 illustrates the image of FIG. 1*b* rotated 90 degrees counter-clockwise.

For comparison purposes, FIG. 8 shows the image 26 rotated 90 degrees counter-clockwise. When fetching image data stored in the memories depicted in FIG. 5 for the raster order, 90 degree-rotated presentation shown in FIG. 8, 1.0 memory accesses per pixel for bank 32, and 2.0 memory accesses per pixel for bank 34 are required. From FIG. 8, it can be seen that the samples $Y_{0,7}$, $Y_{1,7}$, $Y_{2,7}$, and $Y_{3,7}$ are the luma components for the pixels in the first row of the rotated image. However, these luma components are stored, respectively, in rows 1, 3, 5, and 7 of the bank 32 depicted in FIG. 5. As the needed luma components for each pixel in the top line are stored in a unique row, each pixel requires one access. Total accesses per pixel for both storing and fetching then is 1.25 and 2.125 memory accesses per pixel for banks 32 and 34, respectfully, for total accesses per pixel of 3.375 for 90 degree-rotated presentations.

If image data is rotated on storing instead of when fetching, the number of memory accesses per pixel for bank 34 can be improved to 0.5, which reduces total accesses per pixel for bank 34 to 0.75, reducing the total accesses per pixel to 2.0 for 90 degree-rotated presentations. The data access efficiency for rotating upon storing is summarized below:

| Rotated | | |
|---|---|---|
| Writes/Pixel | Reads/Pixel | Total Accesses/Pixel |
| Bank 32 | | |
| 1.0 | 0.25 | 1.25 |
| Bank 34 | | |
| 0.5 | 0.25 | 0.75 |

It can be seen that a peak bandwidth condition of 1.25 accesses per pixel occurs in bank 32 if the image data is rotated by 90 degrees upon storing. (This peak bandwidth condition of 1.25 accesses per pixel also occurs in bank 32 if the image data is rotated by 270 degrees upon storing.)

The image that is stored in a memory and fetched for display is preferably a "frame." As the term is used herein, "frame" generally refers to the set of pixels (pixmap) that fills a display screen. A frame may be comprised of one or more still or video images that may be displayed in one or more windows, sprites, or other overlays. Different windows may be used for displaying the output of simultaneously running applications. For example, a main window may display the user interface for the communication functions of a mobile telephone, while a sub-window simultaneously displays a television video stream.

It is desirable to be able to rotate one image within a frame while not rotating the other. It is also desirable to store the entire frame using a single storage arrangement. However, displaying a main window without rotation while displaying a sub-window in a rotated orientation is a situation where data access efficiency suffers when the image is stored using certain storage arrangements. For example, consider the storage arrangement depicted in FIG. 5. As explained above, when displaying an entire frame without rotation data access efficiency is good, but when the entire frame is displayed with rotation, the data access efficiency suffers. Further, when displaying the main window of a frame without rotation while simultaneously displaying a sub-window of the frame in a rotated orientation, data access efficiency will be a blend of the good and poor access efficiencies. Moreover, because a system needs to have enough bandwidth to accommodate peak and not merely average bandwidth requirements, a system which utilizes the storage arrangement of FIG. 5 must be provided with a clock frequency sufficiently high to accommodate the bandwidth peak associated with fetching the sub-window of the frame in a rotated orientation. Moreover, the high clock frequency that the storage arrangement of FIG. 5 requires is disadvantage. Accordingly, a method and apparatus for accessing reduced color-resolution image data in a memory for display in both rotated and non-rotated orientations in a manner that reduces peak bandwidth requirements is desirable.

Figure 6:
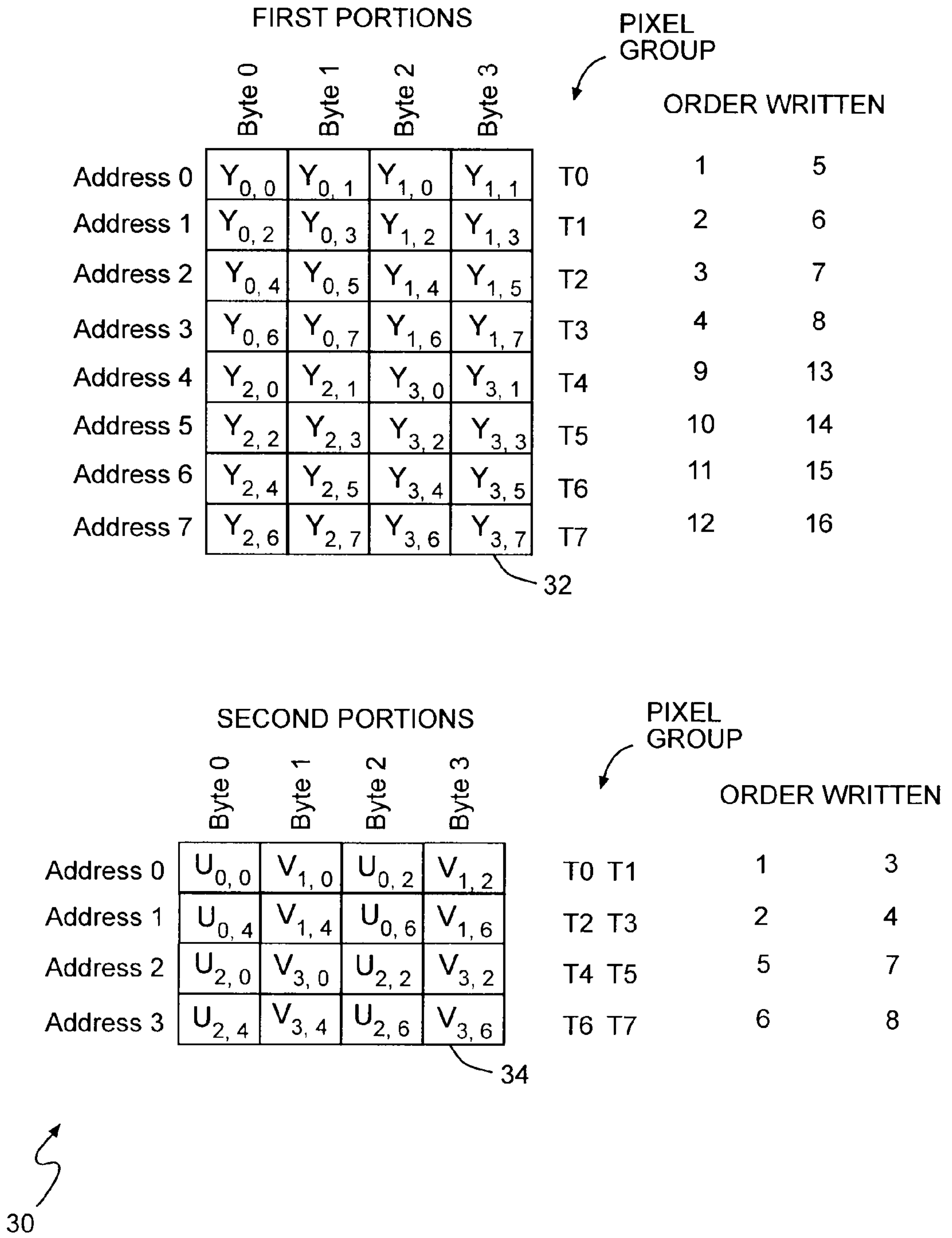
FIG. 6 illustrates the first memory of FIG. 2*a* with the reduced color-resolution image of FIG. 1*b* stored in the memory according to one embodiment of the invention.

FIG. 6 illustrates one preferred arrangement of image data according to a first aspect of the invention. Preferably, a memory having a plurality of first portions and a plurality of second portions is provided. For example, one of the memories 30, 36, or 40 is provided. For each of the pixel groups, a memory address is generated that corresponds to one of the first portions. Each such address is for use with all of the luma components of a pixel group. Preferably, all of the luma components of a pixel group are stored at the address. In addition, for each pixel group, a memory address is generated that corresponds to one of the second portions. Each such address is for use with all of the chroma components of a pixel group. Preferably, all of the chroma components of a pixel group are stored at the address.

FIG. 6 illustrates YUV 4:2:0 data of the image 28 stored in the memory 30 according to a first preferred aspect of the invention. FIG. 6 also shows the order in which the luma and chroma components are stored, assuming a raster order presentation to the chroma subsampling unit 46. Preferably, addresses are generated for the presented pixel components. For the pixel group T0 (FIG. 1*b*), the memory address 0 in the first portion of memory 30 (bank 32) is generated. Preferably, the luma components of the pixel group T0 ($Y_{0,0}$, $Y_{0,1}$, $Y_{1,0}$, and $Y_{1,1}$) are stored in the first portion of the memory at address 0. Moreover, for the pixel group T0, the memory address 0 in the second portion of memory 30 (bank 34) is generated. The chroma components of the pixel group T0 ($U_{0,0}$, and $V_{1,0}$) are stored in the second portion of the memory at address 0. For each of the of the pixel groups T0-T7 (FIG. 1*b*), FIG. 6 shows address where the group is stored.

In a preferred embodiment, the memory addresses for the luma components of horizontally adjacent pixel groups correspond to sequential first portions of the memory. For example, the pixel groups T0, T1, T2, and T3 are horizontally adjacent. Likewise, the pixel groups T4, T5, T6, and T7 are horizontally adjacent (FIG. 1*b*). Referring to FIG. 6, it can be seen that horizontally adjacent pixel groups correspond to sequential first portions of the memory. For instance, the memory addresses generated for the luma components of the pixel groups T0, T1, T2, and T3 are, respectively, 0, 1, 2, and 3, which are sequential. Similarly, the memory addresses generated for the luma components of the pixel groups T4, T5, T6, and T7 are, respectively, 4, 5, 6, and 7, which are also sequential.

Preferably, the memory addresses of the chroma components of horizontally adjacent pairs of pixel groups correspond to sequential second portions of the memory. For example, the pixel groups T0, T1, T2, and T3 are horizontally adjacent, and the pixel groups T0 and T1 form a horizontally adjacent pair, as does the pixel group T2 and T3. Likewise, the T4, T5, T6 and T7 are horizontally adjacent, and the pixel groups T4 and T5 form a horizontally adjacent pair, as does the pixel group T6 and T7. Referring to FIG. 6, it can be seen that horizontally adjacent pairs of pixel groups correspond to sequential second portions of the memory. The memory addresses generated for the chroma components of the horizontally adjacent pairs of pixel groups (T0, T1) and (T2, T3) are, respectively, 0, and 1, which are sequential. Similarly, the memory addresses generated for the chroma components of the horizontally adjacent pairs of pixel groups (T4, T5) and (T6, T7) are, respectively, 2 and 3, which are also sequential.

Storing image data according to the arrangement of FIG. 6 requires 0.5 memory accesses per pixel for bank 32, and 0.25 memory accesses per pixel for bank 34, again assuming the memory bus is four bytes wide. When both banks are considered, this arrangement requires 0.75 memory accesses per pixel for storing image data. When fetching is taken into consideration, it will be appreciated that fetching for raster order, non-rotated presentation requires 0.5 memory accesses per pixel for bank 32, and 0.25 memory accesses per pixel for bank 34. Taking both banks into account, 0.75 memory accesses per pixel are required for fetching. Thus, the total accesses per pixel for both storing and fetching are 1.5 for non-rotated presentations. The data access efficiency for FIG. 6 is summarized in the tables below:

| Non-Rotated | | |
|---|---|---|
| Writes/Pixel | Reads/Pixel | Total Accesses/Pixel |
| Bank 32 | | |
| 0.5 | 0.5 | 1.0 |
| Bank 34 | | |
| 0.25 | 0.25 | 0.5 |

It can be seen that a peak bandwidth condition of 1.0 accesses per pixel occurs in bank 32 if the image data is stored for non-rotated fetching according to one embodiment of the invention.

Now consider access efficiency if the data stored in the arrangement of FIG. 6 is fetched for 90 degree rotated presentation. While the row order changes from the order used for fetching for non-rotated presentation, it is still possible to fetch data for rotated presentation without increasing the peak bandwidth condition, as summarized in the tables below:

| Rotated | | |
|---|---|---|
| Writes/Pixel | Reads/Pixel | Total Accesses/Pixel |
| Bank 32 | | |
| 0.5 | 0.5 | 1.0 |
| Bank 34 | | |
| 0.25 | 0.5 | 0.75 |

It can be seen that a peak bandwidth condition of 1.0 accesses per pixel occurs in bank 32 if the image data is stored for non-rotated fetching, but fetched for rotated presentation according to one embodiment of the invention.

Figure 7:
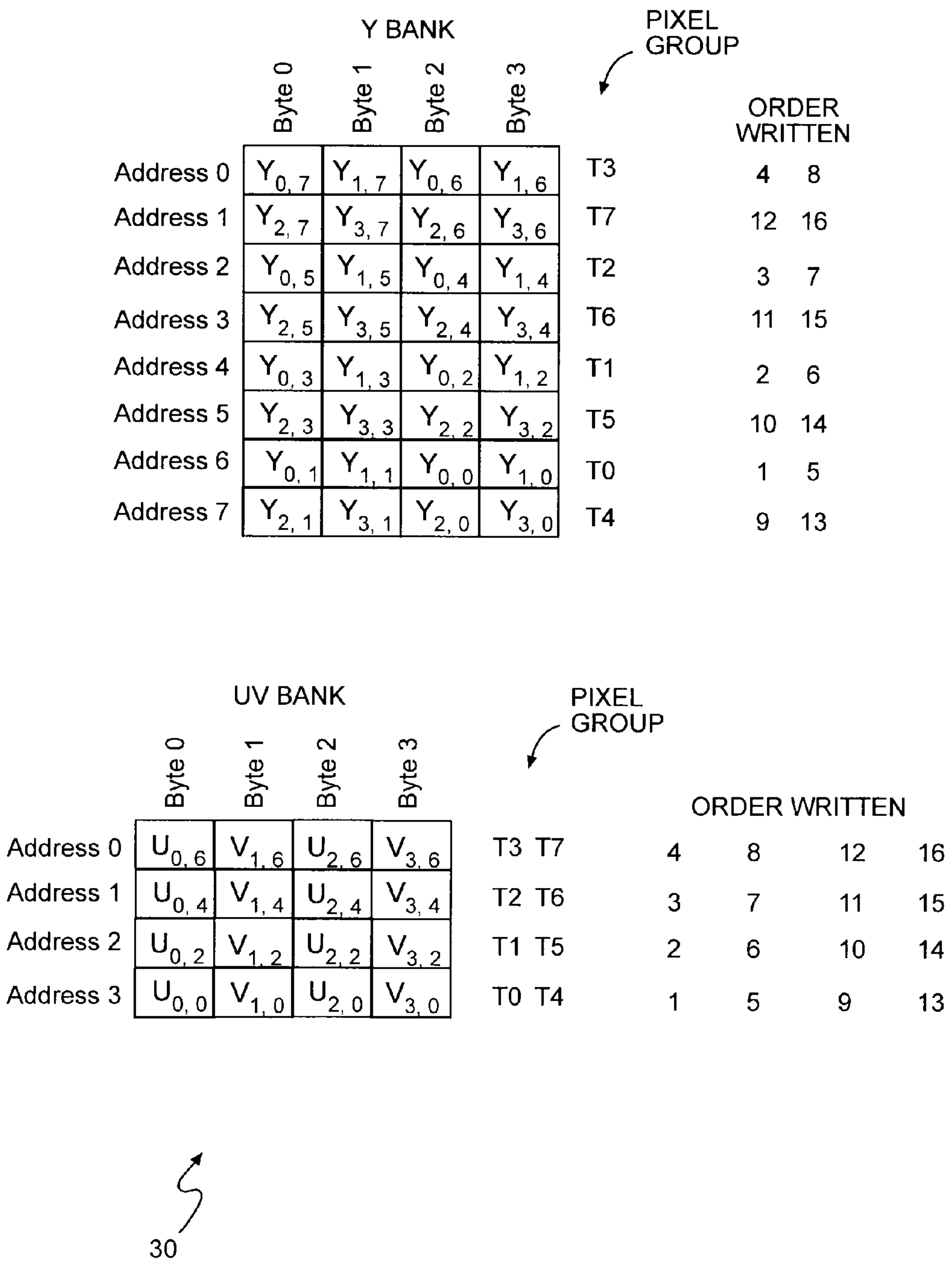
FIG. 7 illustrates the first memory of FIG. 2*a* with the reduced color-resolution image of FIG. 1*b* stored in the memory according to one alternate embodiment of the invention.

FIG. 7 illustrates a preferred arrangement of image data according to a second aspect of the invention. According to the invention, a memory having a plurality of first portions and a plurality of second portions is preferably provided, such as, for example, one of the memories 30, 36, or 40. For each of the pixel groups in an image, a memory address is generated that corresponds to one of the first portions. Each such address is for use with all of the luma components of a pixel group. Preferably, all of the luma components of a pixel group are stored at the address. In addition, for each of the pixel groups in an image, a memory address is generated that corresponds to one of the second portions. Each such address is for use with all of the chroma components of a pixel group. Preferably, all of the chroma components of a pixel group are stored at the address.

FIG. 7 illustrates YUV 4:2:0 data of the image 28 stored in the memory 30 according to the second aspect of the invention. FIG. 7 also shows the order in which the luma components are stored, and the order in which the chroma components are stored, assuming a raster order presentation to the chroma subsampling unit 46. For the pixel group T0 (FIG. 1*b*), the memory address 6 in the first portion of memory 30 (bank 32) is generated. Preferably, the luma components of the pixel group T0 ($Y_{0,0}$, $Y_{0,1}$, $Y_{1,0}$, and $Y_{1,1}$) are stored in the first portion of the memory at address 6. The memory address 3 in the second portion of memory 30 (bank 34) is generated for the chroma components of pixel group T0. Preferably, the chroma components of the pixel group T0 ($U_{0,0}$, and $V_{1,0}$) are stored in the second portion of the memory at address 3. FIG. 7 additionally shows the pixel group or groups stored at each memory address.

In a preferred embodiment, the memory addresses for the luma components of vertically adjacent pixel groups correspond to sequential first portions of the memory. For example, the pixel groups T0 and T4 are vertically adjacent. Likewise, the pixel groups: T1 and T5; T2 and T6; T3 and T7 are vertically adjacent (FIG. 1*b*). Referring to FIG. 7, it can be seen that the luma components of vertically adjacent pixel groups correspond to sequential first portions of the memory. The memory addresses generated for the luma components of the pixel groups T0 and T4 are, respectively, 6 and 7, which are sequential. Similarly, the memory addresses generated for the luma components of the pixel groups T1 and T5 are, respectively, 4 and 5. Further, the memory addresses generated for the luma components of the pixel groups T2 and T6 are, respectively, 2 and 3. Finally, the memory addresses generated for the luma components of the pixel groups T3 and T7 are, respectively, 0 and 1.

In a further preferred embodiment, the memory addresses of the chroma components of vertically adjacent pairs of pixel groups correspond to sequential second portions of the memory. For example, the pixel groups: T0 and T4; T1 and T5; T2 and T6; T3 and T7 are vertically adjacent pairs. Referring to FIG. 7, this embodiment can be seen. The memory addresses generated for the chroma components of the vertically adjacent pairs of pixel groups (T0, T4), (T1, T5), (T2, T6), and (T3, T7) are, respectively, 3, 2, 1, and 0, which are sequential.

Storing image data according to the arrangement of FIG. 7 requires 0.5 memory accesses per pixel for bank 32, and 0.5 memory accesses per pixel for bank 34, again assuming the memory bus is four bytes wide. When both banks are considered, this arrangement requires 1.0 memory accesses per pixel for storing image data. When fetching for 90 degree-rotated, raster order presentation, 0.5 memory accesses per pixel are required for bank 32, and 0.25 memory accesses per pixel are needed for bank 34. Taking both banks into account, 0.75 memory accesses per pixel are required for fetching. Thus, the total accesses per pixel for both storing and fetching are 1.75 for 90 degree rotated presentations. The data access efficiency information for FIG. 7 is summarized in the tables below:

| 90 Degree Rotated on Storing/Fetching | | |
|---|---|---|
| Writes/Pixel | Reads/Pixel | Total Accesses/Pixel |
| Bank 32 | | |
| 0.5 | 0.5 | 1.0 |
| Bank 34 | | |
| 0.50 | 0.25 | 0.75 |

It can be seen that a peak bandwidth condition of 1.0 accesses per pixel occurs in bank 32 if the image data is stored for rotated fetching according to one embodiment of the invention.

Now consider access efficiency if the data stored in the arrangement of FIG. 7 is fetched for non-rotated presentation. While the row order changes from the order used for fetching for 90 degree rotated presentation, it is still possible to fetch data for non-rotated presentation without increasing the peak bandwidth condition, as summarized in the tables below:

| 90 Degree Rotated on Storing/0 Degree Rotated on Fetching | | |
|---|---|---|
| Writes/Pixel | Reads/Pixel | Total Accesses/Pixel |
| Bank 32 | | |
| 0.5 | 0.5 | 1.0 |
| Bank 34 | | |
| 0.5 | 0.5 | 1.0 |

It can be seen that a peak bandwidth condition of 1.0 accesses per pixel occurs in banks 32 and 34 if the image data is stored for rotated fetching, but fetched for non-rotated presentation according to one embodiment of the invention.

Comparing storage arrangements of FIGS. 6 and 7 with the storage arrangement of FIG. 5, it will be appreciated that an important advantage of the present invention is that the peak bandwidth requirement does not exceed 1.0 accesses per pixel, whereas the FIG. 5 storage arrangement requires 1.25 accesses per pixel if the data is rotated by 90 degrees upon storing. Accordingly, a significant disadvantage of the storage arrangement of FIG. 5 is there may be a need to increase clock frequency in order to accommodate the peak bandwidth requirements.

In contrast, the storage arrangements according to the invention provide a significant advantage when used for both non-rotated and 90 degree-rotated presentations. There is no corresponding need to increase clock frequency to accommodate a bandwidth requirement peak. Thus, it will be appreciated that the storage arrangement of the present invention advantageously reduces clock speed and conserves power.

FIG. 9 illustrates a preferred arrangement of YUV 4:2:0 data of the image 28 stored in the memory 30 according to the first aspect of the invention. FIG. 9 is similar to FIG. 6, except that FIG. 6 is non-rotated and FIG. 9 is 180 degree-rotated. The degree of data access efficiency, i.e., the number of access per pixel, is that same for the arrangement of FIGS. 6 and 9. The discussion of FIG. 6 herein applies to FIG. 9 and, accordingly, is not repeated.

FIG. 10 illustrates a preferred arrangement of YUV 4:2:0 data of the image 28 stored in the memory 30 according to the second aspect of the invention. FIG. 10 is similar to FIG. 7, except that FIG. 7 is rotated 90 degrees and FIG. 10 is rotated 270 degrees. The degree of data access efficiency is that same for the arrangement of FIGS. 7 and 10. The discussion of FIG. 7 herein applies to FIG. 10 and, accordingly, is not repeated.

Figure 11:
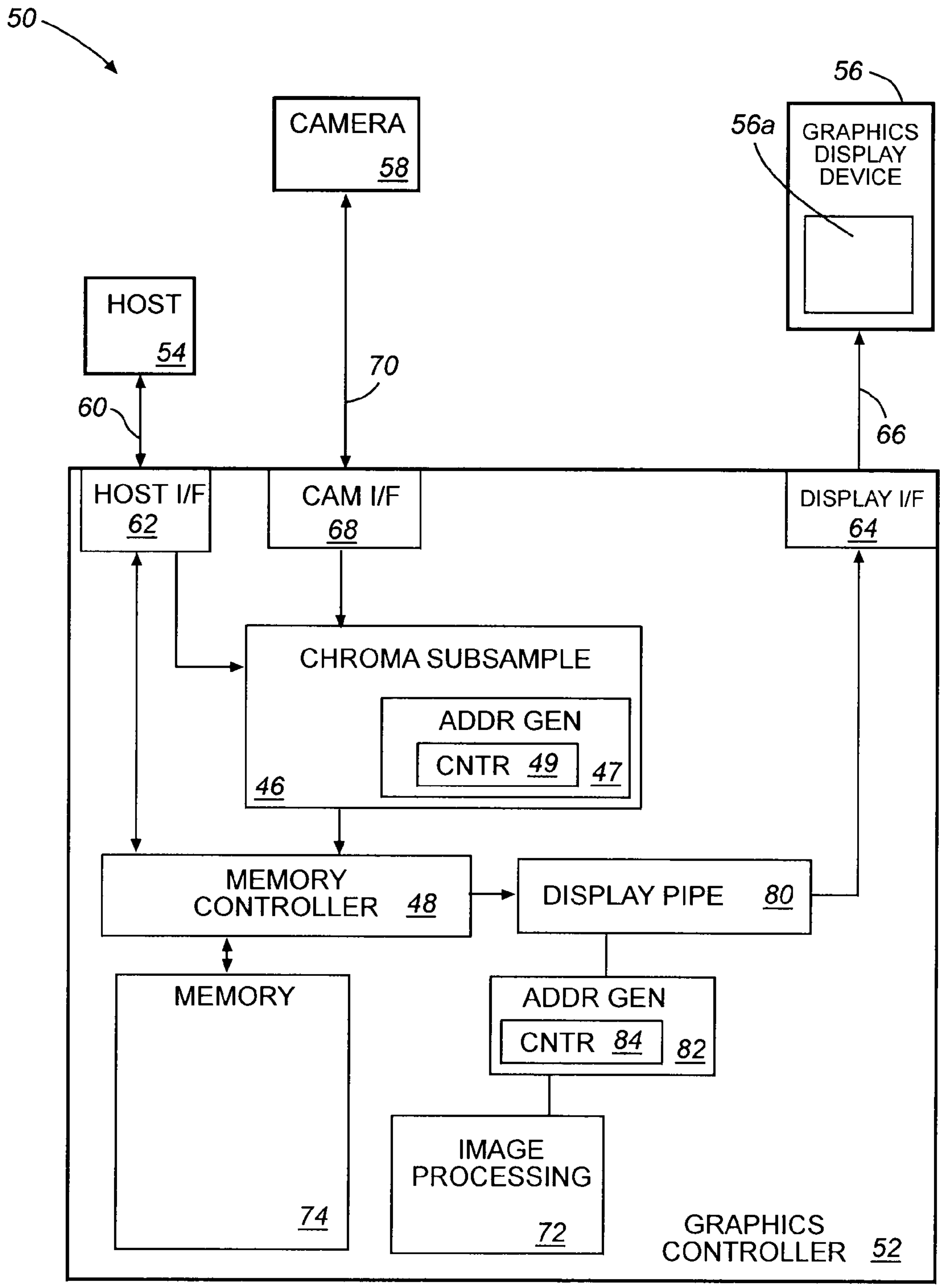
FIG. 11 illustrates a block diagram of a graphics display system according to one embodiment of the invention.

FIG. 11 illustrates a block diagram of a graphics display system 50 illustrating a preferred embodiment of the invention. The graphics display system 50 includes a graphics display controller 52 according to one preferred embodiment. The system 50 may be any digital system or appliance. Examples of such devices and appliances include: mobile telephones, personal digital assistants, digital cameras, and digital music players. Where the system 50 is a portable digital system or appliance, it is typically powered by a battery (not shown). The system 50 typically includes a host 54, a graphics display device 56, and a camera module 58. The graphics controller 52 drives the display device and interfaces the host and the camera module with the display device.

The host 54 is typically a microprocessor, but may be a digital signal processor, a computer, or any other type of controlling device adapted for controlling digital circuits. The host 54 communicates with the graphics controller 52 over a bus 60 that is coupled with a host interface 62 in the graphics controller.

The graphics controller 52 includes a display device interface 64 for interfacing between the graphics controller and the display device 56 over display device bus 66. LCDs are typically used as display devices in portable digital appliances, such as mobile telephones, but any devices capable of rendering pixel data in visually perceivable form may be employed. In a preferred embodiment, the display device 56 is an LCD that has a display area 56*a*. In another preferred embodiment, the display device 56 is a printer.

Preferably, the graphics display controller 52 is a separate integrated circuit from the remaining elements of the system, that is, the graphics controller is "remote" from the host, camera, and display device. The graphics controller 52 includes a camera interface 68 ("CAM I/F") for receiving pixel data output on data lines of a bus 70 from the camera 58.

A number of image processing operations may be performed on data provided by an image data source, such as the host or the camera. Such image processing operations may be performed by units included in an image processing block indicated generally as 72. The image processing block 72 may include, for example, a CODEC for compressing and decompressing image data. In addition, the image processing block 72 preferably includes a unit for reintroducing missing color information into reduced color resolution image data, such as by interpolation or repetition of U and V components. Further, the image processing block 72 preferably includes a unit for converting the image data from the YUV color space to the RGB color space. Moreover, the image processing block 72 preferably includes a unit for scaling and cropping image data received from the host 54 and the camera 58.

The source of image data in the system 50 is preferably the camera 58, however, this is not essential. Image data may be provided by the host or any other image data source 44. Further, in alternative embodiments, the image data may be provided by a plurality of image data sources simultaneously or at different times.

In a preferred embodiment, the graphics controller 52 includes a memory 74 for storing frames of image data in a frame buffer 76. In other embodiments, however, the memory 74 may be remote from the graphics controller. Data are stored in and fetched from the memory 50 under control of a memory controller 78. The memory 74 is preferably an SRAM, however, any type of memory may be employed. Image data stored in the memory 76 are fetched and transmitted through a display pipe 80. Reduced color-resolution image is generally not suitable for display. Accordingly, display pipe 80 may include logic for reintroducing missing color information into the image, such as by interpolation or repetition. Image data are transmitted from the display pipe 80 through the display device interface 64 and output bus 66 to the display device 56.

In one preferred embodiment, the graphics controller includes a chroma subsampling unit 46. The chroma subsampling unit 46 preferably samples the data in the manner described above with reference to FIG. 1*a*, and outputs to the memory controller 48 image data samples in the YUV 4:2:0 format and address information for storing each sample. The address for a sample is provided by an address generator 47. The addresses are provided such that the samples can be stored in memory in a storage arrangement according to the invention. Addresses are determined by counting the pixels provided by the image data source and, accordingly, the address generator preferably includes a single counter 49.

One advantage of storing image data according to the invention is that only a single address counter 49 is needed, as opposed to alternative storage arrangements where separate counters are needed for luma and chroma samples. The single address counter may be shared between two banks. For example, if the word address for Bank 1. (luma) is Adr [31:0], then the word address of Bank 2 (chroma) will be Adr [31.1]. As a more particular example, the counter output for the four-byte word (or portion) stored in bank 32 at address 3 in FIG. 6 would be given by 0000 0000 0000 0000 0000 0000 0000 0011. The four-byte word (or portion) stored in bank 34 at address 1 in FIG. 6 would be given by 0000 0000 0000 0000 0000 0000 0000 001.

While image data is preferably rotated upon storing, in an alternative embodiment image data may be rotated on the output side. In the case of fetching for display, the display pipe 80 employs an address generator 82 that provides memory addresses for luma and chroma components. In the case of fetching for further processing, the image processing logic 72 uses the address generator 82 in a similar manner.

The address generator 82 provides addresses such that the samples can be fetched from memory according to the invention. As mentioned above, an image stored for non-rotated presentation e.g., FIG. 6, may be fetched for rotated presentation by changing the sequence in which row addresses are generated. Similarly, an image stored for rotated presentation, e.g., FIG. 7, may be fetched for rotated presentation by changing the sequence in which row addresses are generated. Preferably, the address generator 82 is adapted to provide addresses in such alternate sequences.

While the YCbCr color space (referred to herein as YUV) is preferred, the embodiments of the invention are not limited for use only with image data of this type. Embodiments of the invention may be used with image data defined in any suitable color space, such as YUV, RGB, YIQ, CMYK, YPbPr, HSV, and HSL.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. As described above, the invention preferably relates to a device or an apparatus specially constructed for performing these operations. It should be appreciated, however, that the invention may be employed in a general purpose computer selectively activated or configured by a computer program stored in the computer. In particular, various general purpose computer systems may be used with computer programs written in accordance with the teachings herein. Accordingly, it should be understood that the invention can also be embodied as computer readable code on a computer readable medium. In one embodiment, the invention is directed to computer readable code for generating memory addresses to be used for storing reduced color-resolution image data in a memory for display in rotated and non-rotated orientations in a manner that reduces peak bandwidth requirements.

A computer readable medium is any data storage device that can store data which can be thereafter read by a computer system. A computer readable medium includes an electromagnetic carrier wave in which the computer code is embodied. Examples of the computer readable medium include, among other things, floppy disks, memory cards, hard drives, RAMs, ROMs, EPROMs, compact disks, and magnetic tapes.

Although the invention has been described in some detail for purposes of clarity of understanding, it will be apparent that certain changes and modifications may be practiced within the scope of the appended claims. Accordingly, the present embodiments are to be considered as illustrative and not restrictive. Further, the terms and expressions that have been employed in the foregoing specification are used as terms of description and not of limitation, and are not intended to exclude equivalents of the features shown and described or portions of them. The scope of the invention is defined and limited only by the claims that follow.

We claim:

1. A method for storing image data for efficient data access, the image data for display in an original or other orientation, comprising:

selecting a storage arrangement, the selected storage arrangement corresponding with a particular display orientation;

receiving the image data as luma and chroma samples, the image data having been created by chroma-subsampling an image in the original orientation using 2×2 pixel tiles as sample areas;

providing a memory, the memory having a plurality of first memory portions and a plurality of second memory portions, each of the first and second memory portions sized to store four samples and accessible at a distinct memory address;

generating a first memory address according to the selected storage arrangement for each 2×2 pixel tile of the image, and storing the luma samples in the memory, the storing of the luma samples including storing the luma samples of a particular pixel tile together in a first memory portion having the first memory address generated for the particular pixel tile; and generating a second memory address according to the selected storage arrangement for each pair of adjacent 2×2 pixel tiles of the image, and storing the chroma samples in the memory, the storing of the chroma samples including storing the chroma samples of a particular pair of adjacent pixel tiles together in a second memory portion having the second memory address generated for the particular pair of adjacent pixel tiles.

2. The method of claim 1, wherein the storing of the luma samples of a particular pixel tile together in a first memory portion having the first memory address generated for the particular pixel tile includes storing the luma samples in a particular order, the particular order including:

arranging the luma samples of top and bottom horizontal lines of the particular pixel tile in a raster sequence beginning with the top-left pixel, wherein the first and second horizontal lines are determined according to a view of the pixel tile in the particular display orientation.

3. The method of claim 1, wherein the storing of the chroma samples of a particular pair of adjacent pixel tiles together in a second memory portion having the second memory address generated for the particular pair of adjacent pixel tiles includes storing the chroma samples in a particular order, the particular order including:

arranging the chroma samples of a left pixel tile and a right pixel tile in a sequence in which the chroma samples of the right pixel tile follow the left pixel tile, the right pixel tile being horizontally adjacent to the left pixel tile, wherein horizontal adjacency is determined according to a view of the image in the particular display orientation.

4. The method of claim 1, wherein the generating of a first memory address according to the selected storage arrangement for each pixel tile of the image includes generating sequential first memory addresses for horizontally-adjacent pixel tiles, wherein horizontal adjacency is determined according to a view of the image in the particular display orientation.

5. The method of claim 1, wherein the generating of a second address according to the selected storage arrangement for each pair of adjacent pixel tiles of the image includes generating sequential second memory addresses for horizontally-adjacent pairs of pixel tiles, wherein horizontal adjacency is determined according to a view of the image in the particular display orientation.

6. The method of claim 1, wherein the image data having been created by chroma-subsampling an image in the original orientation using 2×2 pixel tiles as sample areas includes chroma-subsampling the image in a 4:2:0 format.

7. The method of claim 1, wherein the image data having been created by chroma-subsampling an image in the original orientation using 2×2 pixel tiles as sample areas includes chroma-subsampling the image in a 4:1:1 format.

8. The method of claim 1, wherein two or more chroma components of a pixel tile are averaged to create a chroma sample.

9. The method of claim 1, further comprising fetching the image data from the memory for display in the particular display orientation, the fetching of image data including fetching the luma samples of a first line of the image from a first set of memory addresses, and thereafter fetching the luma samples of a second line of the image from the first set of memory addresses, wherein the luma samples of the first and second lines are fetched from sequential addresses of the first set of memory addresses.

10. The method of claim 1, further comprising fetching the image data from the memory for display in a second display orientation, the second display orientation being different from the particular display orientation, the fetching of image data including fetching the luma samples of a first line of the image from a first set of memory addresses, and thereafter fetching the luma samples of a second line of the image from the first set of memory addresses, wherein the luma samples of the first and second lines are fetched from addresses of the first set of memory addresses in a particular order, the particular order being in accord with the second display orientation.

11. The method of claim 1, the generating of a unique second memory address according to the selected storage arrangement for each pair of adjacent pixel tiles of the image further including: generating of a unique second memory address according to the selected storage arrangement for each pair of horizontally-adjacent pixel tiles of the image, wherein horizontal adjacency is determined according to a view of the image in the particular display orientation.

12. The method of claim 1, the generating of a unique second memory address according to the selected storage arrangement for each pair of adjacent pixel tiles of the image further including: generating of a unique second memory address according to the selected storage arrangement for each pair of vertically-adjacent pixel tiles of the image, wherein vertically adjacency is determined according to a view of the image in the particular display orientation.

13. A display controller for storing image data of an image for efficient data access, the image data for display in an original or other orientation, comprising:

a memory, the memory having a plurality of first memory portions and a plurality of second memory portions, each of the first and second memory portions sized to store four pixel components and accessible at a distinct memory address;

a unit to receive the image data and to store the received image data in the memory, wherein the unit stores image data including pixels haying one luma component for each pixel of the image and stores two chroma components for each 2×2 pixel tile of the image; and an address generator to generate:

a first memory address for each 2×2 pixel tile of the image according to a selected storage arrangement corresponding with a particular display orientation, wherein the unit stores the luma components of a particular pixel tile together in a first memory portion having the first memory address generated for the particular pixel tile; and a second memory address for each pair of adjacent 2×2 pixel tiles of the image according to the selected storage arrangement, wherein the unit stores the chroma components of a particular pair of adjacent pixel tiles together in a second memory portion having the second memory address generated for the particular pair of adjacent pixel tiles.

14. The display controller of claim 13, wherein the unit stores the luma components of a particular pixel tile together in a first memory portion having the first memory address generated for the particular pixel tile in a particular order, the particular order including:

arranging the luma components of top and bottom horizontal lines of the pixel tile in a raster sequence beginning with the top-left pixel, wherein the top and bottom horizontal lines are determined according to a view of the pixel tile in the particular display orientation.

15. The display controller of claim 13, wherein the unit storing the chroma components of a particular pair of adjacent pixel tiles together in a second memory portion having the second memory address generated for the particular pair of adjacent pixel tiles further comprises the unit storing the chroma samples in a particular order, the particular order including:

arranging the chroma components of a left pixel tile and a right pixel tile in a sequence in which the chroma samples of the right pixel tile follow the left pixel tile, the right pixel tile being horizontally adjacent to the left pixel tile, wherein horizontal adjacency is determined according to a view of the image in the particular display orientation.

16. The display controller of claim 13, wherein the address generator generating a first memory address for each 2×2 pixel tile of the image according to a selected storage arrangement corresponding with a particular display orientation further comprises the address generator generating sequential first memory addresses for horizontally-adjacent pixel tiles, wherein horizontal adjacency is determined according to a view of the image in the particular display orientation.

17. The display controller of claim 13, wherein the address generator generating a second address according to the selected storage arrangement for each pair of adjacent pixel tiles of the image further comprises the address generator generating sequential second memory addresses for horizontally-adjacent pairs of pixel tiles, wherein horizontal adjacency is determined according to a view of the image in the particular display orientation.

18. The display controller of claim 13, wherein the unit receives image data that has been chroma-subsampled in a 4:2:0 format.

19. The display controller of claim 13, wherein the unit is operable to chroma-subsample received image data according to a 4:2:0 format.

20. The display controller of claim 19, wherein the unit receives the image data as raster ordered pixels.

21. The display controller of claim 13, wherein the unit receives image data that has been chroma-subsampled in a 4:1:1 format.

22. The display controller of claim 13, wherein the unit is operable to chroma-subsample received image data according to a 4:1:1 format.

23. The display controller of claim 13, wherein two or more chroma components of a pixel tile are averaged to create a chroma sample.

24. A display controller, comprising:

a memory array, the memory array having a plurality of rows each row sized to store four pixel components and accessible at a distinct memory address;

a unit to receive pixel data of an image in raster order, and to store one luminance component for each pixel of the image and two chrominance components for each 2×2 pixel tile of the image in the memory array; and an address generator to generate:

a first memory address for each 2×2 pixel tile of the image, and a second memory address for each pair of adjacent 2×2 pixel tiles of the image;

wherein the unit stores the luminance components of a particular pixel tile at the first memory address generated for the particular pixel tile, and the unit stores the chrominance components of a particular pair of adjacent pixel tiles at the second memory address generated for the particular pair of pixel tiles.

25. The display controller of claim 24, wherein the address generator generating a first memory address for each pixel tile of the image further comprises the address generator generating sequential first memory addresses for horizontally-adjacent pixel tiles, wherein horizontal adjacency is determined according to a view of the image in a first orientation.

26. The display controller of claim 25, wherein the address generator generating a first memory address for each pixel tile of the image further comprises the address generator generating sequential first memory addresses for horizontally-adjacent pixel tiles, wherein horizontal adjacency is determined according to a view of the image in a second orientation, the second orientation being a ninety-degree, left-rotated view of the image in the first orientation.

27. The display controller of claim 24, wherein:

the memory array includes a first memory array and a second memory array, each generated first memory address identifies a row of the first memory array, and each generated second memory address identifies a row of the second memory array.

28. The display controller of claim 24, the address generator including an address counter, wherein the address counter generates a first memory address for each pixel tile of the image, and a second memory address for each pair of adjacent pixel tiles of the image, the second memory address being the left N-1 bits of the first memory address, where the first memory address is N bits.

29. The display controller of claim 24, wherein the two chrominance components for each 2×2 pixel tile of the image include a Cr component and a Cb component.

30. The display controller of claim 24, wherein the two chrominance components for each 2×2 pixel tile of the image include an I component and a Q component.

31. A non-transitory computer readable medium embodying a program of instructions for execution by a computer which, when executed by the computer, carries out a method for storing image data for efficient data access, the image data for display in an original or other orientation, comprising:

receiving an indication of a selected storage arrangement corresponding with a particular display orientation;

receiving the image data as luma and chroma samples, the image data having been created by chroma-subsampling an image in the original orientation using 2×2 pixel tiles as sample areas;

generating a first memory address for a memory according to the selected storage arrangement for each 2×2 pixel tile of the image, the memory having a plurality of first memory portions and a plurality of second memory portions, each of the first and second memory portions sized to store four samples and accessible at a distinct memory address, and storing the luma samples in the memory, the storing of the luma samples including storing the luma samples of a particular pixel tile together in a first memory portion having the first memory address generated for the particular pixel tile; and generating a second memory address for the memory according to the selected storage arrangement for each pair of adjacent 2×2 pixel tiles of the image, and storing the chroma samples in the memory, the storing of the chroma samples including storing the chroma samples of a particular pair of adjacent pixel tiles together in a second memory portion having the second memory address generated for the particular pair of adjacent pixel tiles.

* * * * *

UNITED STATES PATENT AND TRADEMARK OFFICE

CERTIFICATE OF CORRECTION

PATENT NO. : 7,868,898 B2
APPLICATION NO. : 11/381853
DATED : January 11, 2011
INVENTOR(S) : Eric Jeffrey et al.

It is certified that error appears in the above-identified patent and that said Letters Patent is hereby corrected as shown below:

Column 17, lines 61-62 delete "image data including pixels having"

Signed and Sealed this
Nineteenth Day of April, 2011

David J. Kappos

David J. Kappos
*Director of the United States Patent and Trademark Office*